US010766973B2

(12) United States Patent
Masukawa et al.

(10) Patent No.: US 10,766,973 B2
(45) Date of Patent: Sep. 8, 2020

(54) METHOD FOR PRODUCING POLYMER FOR ELECTRONIC MATERIAL AND POLYMER FOR ELECTRONIC MATERIAL OBTAINED BY THE PRODUCTION METHOD

(71) Applicant: MARUZEN PETROCHEMICAL CO., LTD., Tokyo (JP)

(72) Inventors: Tomohiro Masukawa, Ichihara (JP); Ryo Fujisawa, Ichihara (JP); Kazuhiko Haba, Ichihara (JP); Satoshi Kakuta, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 54 days.

(21) Appl. No.: 15/735,748

(22) PCT Filed: Apr. 15, 2016

(86) PCT No.: PCT/JP2016/062058
§ 371 (c)(1),
(2) Date: Dec. 12, 2017

(87) PCT Pub. No.: WO2016/208257
PCT Pub. Date: Dec. 29, 2016

(65) Prior Publication Data
US 2018/0134819 A1    May 17, 2018

(30) Foreign Application Priority Data
Jun. 22, 2015  (JP) .................. 2015-125024

(51) Int. Cl.
| C08F 6/06 | (2006.01) |
| C08G 8/04 | (2006.01) |
| C08G 12/26 | (2006.01) |
| C08F 212/14 | (2006.01) |
| C08F 12/24 | (2006.01) |
| C08F 6/02 | (2006.01) |

(52) U.S. Cl.
CPC .................. *C08F 6/06* (2013.01); *C08F 6/02* (2013.01); *C08F 12/24* (2013.01); *C08F 212/14* (2013.01); *C08G 8/04* (2013.01); *C08G 12/26* (2013.01)

(58) Field of Classification Search
CPC .............. C08F 6/06; C08G 12/26; C08G 8/04
See application file for complete search history.

(56) References Cited

U.S. PATENT DOCUMENTS

| 5,679,766 A * | 10/1997 | Zampini ................. C08F 6/003 528/482 |
| 8,674,052 B2 | 3/2014 | Saito et al. |
| 8,722,841 B2 | 5/2014 | Saito et al. |
| 2005/0100815 A1 | 5/2005 | Watanabe et al. |
| 2007/0148587 A1 | 6/2007 | Russell et al. |
| 2010/0183853 A1* | 7/2010 | Ihara ........................ G03F 7/425 428/195.1 |
| 2012/0077345 A1 | 3/2012 | Saito et al. |
| 2013/0122710 A1 | 5/2013 | Saito et al. |
| 2013/0233827 A1 | 9/2013 | Yin et al. |

FOREIGN PATENT DOCUMENTS

| JP | H06-289612 A1 | 10/1994 |
| JP | H07-074073 A1 | 6/1995 |
| JP | H09-143237 A1 | 6/1997 |
| JP | 2000-281739 A1 | 10/2000 |
| JP | 2002-182402 A1 | 6/2002 |
| JP | 2003-342319 A1 | 12/2003 |
| JP | 2006-037117 A1 | 2/2006 |
| JP | 2007-009083 A1 | 1/2007 |
| JP | 2008-038013 A1 | 2/2008 |
| JP | 2009-521539 A1 | 6/2009 |
| JP | 2010-235653 A1 | 10/2010 |
| JP | 2015-512980 A1 | 4/2015 |
| TW | 201134841 A | 10/2011 |
| TW | 201343696 A | 11/2013 |
| WO | 2009/011186 A1 | 1/2009 |
| WO | WO 2009/011186 A1 * | 1/2009 |
| WO | 2008/152907 A1 | 8/2010 |
| WO | 2010/147155 | 12/2010 |

OTHER PUBLICATIONS

Taiwanese Office Action (Application No. 105116125) dated Mar. 11, 2019.
English translation of International Preliminary Report on Patentability (Chapter 1) (Application No. PCT/JP2016/062058) dated Jan. 4, 2018, 8 pages.
International Search Report and Written Opinion (Application No. PCT/JP2016/062058) dated Jul. 5, 2016.
Information Offer Form (and translation obtained from the Global Dossier) from a corresponding Japanese patent application bearing a mailing date of Jan. 28, 2020, 2 pages.
Information Offer Form (and translation obtained from the Global Dossier) from a corresponding Japanese patent application bearing a mailing date of Mar. 6, 2020, 2 pages.
Taiwan Office Action (and English translation) from a corresponding Taiwanese patent application (TW 105116125) dated Feb. 12, 2020, 7 pages.
Japanese Office Action ( Application No. 2017-524695) dated Nov. 19, 2019 (with English translation).

* cited by examiner

*Primary Examiner* — Robert D Harlan
(74) *Attorney, Agent, or Firm* — Burr & Brown, PLLC

(57) ABSTRACT

Provided is a method for producing a polymer for an electronic material having a low content of metal ion impurities and a polymer for an electronic material obtained by such method.
The method for producing a polymer for an electronic material according to the present invention comprises a polymerization step of obtaining a polymer by polymerizing a monomer(s) and a purification step of adding a strong acid having 0 or less pKa to the polymer solution and subsequently performing an ion exchange treatment to reduce the concentration of the metal ion impurities.

3 Claims, No Drawings

METHOD FOR PRODUCING POLYMER FOR ELECTRONIC MATERIAL AND POLYMER FOR ELECTRONIC MATERIAL OBTAINED BY THE PRODUCTION METHOD

TECHNICAL FIELD

The present invention relates to a method for producing a polymer for an electronic material and a polymer for an electronic material obtained by such production method. More specifically, the present invention relates to a method for producing a polymer for an electronic material having a low content of metal ion impurities, wherein the metal ion impurities in a copolymer for an electronic material are efficiently removed by a simple and inexpensive method and a polymer for an electronic material obtained by such production method.

BACKGROUND ART

In photolithography used for manufacture of a semiconductor, a photoresist composition based on various novolac-based polymers and acrylic-based polymers, oxystyrene-based polymers including hydroxystyrene, or the like is used to form, for example, a thin film of a composition for photo lithography such as photoresists and anti-reflection films on a substrate, such as a silicon wafer, or the like, then excimer laser light, etc. is irradiated via a mask with a drawn circuit pattern of a semiconductor device, and by etching the substrate using the photoresist pattern obtained by image development as a protective layer, a fine pattern is formed, which corresponds to the semiconductor circuit, on the surface of the substrate. Along with the increasing accumulation degree, formation of a finer pattern is called for, and currently, lithography techniques by KrF excimer laser light (wavelength of 248 nm) and ArF excimer laser light (wavelength of 193 nm) are used in commercial production. Research and development are in progress also for lithography techniques by F2 excimer laser light with a shorter wavelength (wavelength of 157 nm), EUV (extreme ultraviolet) of a shorter wavelength than those excimer lasers, X-rays, and electron beams.

The above-described various polymers are also used as a functional high-molecular material in various industrial fields, and particularly in the field of electronic materials, they are used as a raw material of a photosensitive resin component, especially a resin component for a semiconductor resist used for an interlayer insulating film such as a semiconductor element, and further as a material for a flat panel display. In recent years, also in fields such as a flat panel display using crystalline liquid and organic EL, enhancement of performance and review for improvement are in progress of optical and electronic parts such as definition enhancement, view angle enhancement, image quality enhancement, high luminance of a light source by use of an optical semiconductor such as light-emitting diode (LED), shortening of wavelengths, whitening, and moreover, frequency enhancement of electronic circuits, and circuits and communications using light. Moreover, progress in the technical field of semiconductors is remarkable, and electronic devices are in rapid progress for downsizing and weight saving, performance enhancement, and multi-functionalization. In order to correspond to such progress, wiring boards need to be highly densified and highly wired. The semiconductor-related material such as various photoresists, lower layer films, interlayer insulating films, or the like, and a material for displays used for an electronic substrate, a semiconductor circuit, a display, or the like, which are designed to be in high density by the fine process as described above are required to have metal ions contained in those high-molecular material suppressed to an extremely small amount. Thus, there is a need for reducing the metal content of polymers, intermediates, and monomers thereof.

Furthermore, while miniaturization of a semiconductor circuit associated with an increasing accumulation degree is in progress, requests are more demanding to reduce the amount of impurities contained in a copolymer used for semiconductor lithography. Especially, metal impurities must be removed as much as possible since they have various adverse influences on manufacture of a semiconductor. For example, when metal impurities, such as sodium and iron, are contained in a copolymer for a chemistry amplification type resist, the metallic component will capture the acid substance generated from an acid generating agent at the time of exposure, and the copolymer which is a substrate component of the resist does not fully dissolve, resulting in failure to form a desired pattern. Moreover, when the metal impurities contained not only in the copolymer for a resist but also in a copolymer for semiconductor lithography, such as a copolymer for a topcoat and a copolymer for an anti-reflection film, ultimately remains at the surface of the semiconductor substrate, the electrical property of the semiconductor will be impaired, resulting in reduction of product yield.

As a method for removing metal impurities in a copolymer for an electronic material, for example, reported are a method wherein the copolymer is extracted using an organic solvent and water and distributed to an organic layer; metal is distributed to an aqueous layer; and the aqueous layer is removed (patent document 1) and a method wherein in an organic solvent solution of a cycloaliphatic hydrocarbon polymer, a poor solvent of such polymer and acid are mixed to solidify the polymer, followed by mixing of the solidified polymer, an insoluble organic solvent, acid, and water to extract metal (patent document 2). Moreover, reported are a method wherein a novolac resin solution passes through a cationic exchange resin and an anion exchange resin which were washed with deionized water and a mineral acid solution (patent document 3), a method wherein a dispersion liquid in which the polymer is dispersed to a dispersion medium is filtered with filters, such as a filter cloth washed beforehand with an acidic aqueous solution, to obtain wet powder of the polymer having a reduced content of metal (patent document 4), and a method wherein a polymer solution passes through an adsorbent, such as a compound between layers of clay, activated carbon, and silica gel, or the like, to remove metal (patent document 5). Other method is reported, wherein a soluble compound capable of forming a complex in an equivalent amount or more of the metal impurities in a polymer is added to a solution of a polymer for a resist and washed with pure water after the reaction had completed (patent document 6). However, these methods are complicated in operation and were difficult to apply for manufacturing copolymers in a commercial scale.

PRIOR ART REFERENCES

Patent Documents

[Patent Document 1] Japanese Patent Application Laid-Open Publication No. 2006-037117
[Patent Document 2] Japanese Patent Application Laid-Open Publication No. 2003-342319

[Patent Document 3] Japanese Patent Application Laid-Open Publication No. H09-143237
[Patent Document 4] Japanese Patent Application Laid-Open Publication No. 2008-038013
[Patent Document 5] Japanese Patent Application Laid-Open Publication No. H07-074073
[Patent Document 6] Japanese Patent Application Laid-Open Publication No. 2002-182402

SUMMARY OF THE INVENTION

Problems to be Solved by the Invention

The object of the present invention is to provide a method for producing a copolymer for an electronic material having a low content of metal ion impurities by efficiently removing the metal ion impurities in the copolymer for an electronic material with a simple and inexpensive method.

Means for Solving the Problems

In order to solve the above-described problems, the present inventors intensively studied to find that the content of the metal ion impurities in the obtained polymer can be reduced extremely easily by adding a strong acid having 0 or less pKa to a polymer solution comprising the polymer obtained by polymerizing a monomer(s) and then performing an ion exchange treatment to reduce the concentration of the metal ion impurities, thereby completing the present invention.

That is to say, according to one aspect of the present invention, there is provided,
a method for producing a polymer for an electronic material comprising:
a polymerization step of obtaining a polymer by polymerizing a monomer(s); and
a purification step of adding a strong acid having 0 or less pKa to the polymer solution and subsequently performing an ion exchange treatment to reduce the concentration of the metal ion impurities.

In one aspect of the present invention, said strong acid is preferably at least one selected from the group consisting of organic sulfonic acid, sulfuric acid, and trifluoroacetic acid.

In one aspect of the present invention, said strong acid is preferably at least one organic sulfonic acid selected from the group consisting of trifluoromethanesulfonic acid, methanesulfonic acid, and p-toluenesulfonic acid.

In one aspect of the present invention, said ion exchange treatment is preferably performed using an ion exchange resin.

In one aspect of the present invention, said polymer is preferably obtained by addition condensation of an aromatic-based monomer with an aldehyde-based and/or a ketone-based monomer.

In one aspect of the present invention, said polymer is preferably obtained by living cationic polymerization of an oxystyrene-based monomer with a vinyl ether-based monomer.

In one aspect of the present invention, said polymer is preferably obtained by radical polymerization of an oxystyrene-based monomer with a styrene-based monomer.

In one aspect of the present invention, said polymer is preferably obtained by radical polymerization of an oxystyrene-based monomer with an (meth) acryate-based monomer.

According to another aspect of the present invention, there is provided a polymer for an electronic material obtained by the above-described production method.

In another aspect of the present invention, the concentration of the metal ion impurities in the polymer for an electronic material is 10 ppb or less.

In one aspect of the present invention, the polymer for an electronic material is preferably used as a film forming material for semiconductor lithography.

In one aspect of the present invention, the polymer for an electronic material is preferably used as a material for a flat panel display.

Effect of the Invention

According to the present invention, a copolymer for an electronic material having a low content of metal ion impurities can be produced by efficiently removing the metal ion impurities in the copolymer for an electronic material with a simple and inexpensive method, without the need of a large-scale reconstruction of manufacturing equipment and a time-consuming step.

MODE FOR CARRYING OUT THE INVENTION

Embodiments of the present invention will be described below; however, the present invention is not restricted to the embodiments below, and it should be understood that appropriate modifications and improvements made to the following embodiments based on the common knowledge of those skilled in the art are also included within the scope of the present invention, without departing from the spirit of the present invention.

<Method for Producing Copolymer for Electronic Material>

The method for producing a polymer for an electronic material according to the present invention comprises at least a polymerization step and a purification step. Each step of the method for producing the polymer and the structure of the polymer will be described in details below.

(Polymerization Step)

The polymerization step according to the present invention is a step of obtaining a polymer by polymerizing a monomer(s) and can be carried out by a well-known method. For example, there is a lump heating method, in which a monomer is dissolved in a solvent together with a polymerization initiator and directly heated to polymerize, and a dropping polymerization step, in which a monomer and a polymerization initiator are added dropwise in a heated solvent to polymerize. Further, the dropping polymerization step includes a mixing and dropping method, in which a monomer is dissolved in a solvent together with a polymerization initiator if necessary and added dropwise to a heated solvent to polymerize, an independent dropping method, in which a monomer and a polymerization initiator are individually dissolved in a solvent if necessary and individually added dropwise in a heated solvent to polymerize, or the like. In the present invention, the dropping polymerization method is preferred.

On one hand, since a low-concentrated radical is brought into contact in the polymer system for the lump heating method and in the dropping liquid reservoir before dropping into the polymer system for the mixing dropping method, when the concentration of the unreacted monomer is in a high state, a high polymer having molecular weight of 100 000 or more tend to generate, this being one cause of generating deficiency in the pattern. On the other hand, since the polymerization initiator and the monomer do not coexist in the dropping liquid reservoir and the concentration of the unreacted monomers is kept low when dropping is performed into the polymer system in the independent dropping method, generation of the high polymer is reduced. Therefore, the independent dropping method is especially preferable for the polymerization method for the present invention. Composition of the monomer to be added dropwise with drop time and, for example, the composition ratio of the monomer, a polymerization initiator, and a chain transfer agent may be varied in the mixing dropping method and the individual dropping method.

A conventionally well-known polymerization initiator can be used. A polymerization initiator for radical polymerization is preferably, for example, a radical polymerization initiator, such as an azoic compound and a peroxide. Particular examples of the polymerization initiator of an azoic compound may include, 2,2'-azobisisobutyronitrile, 2,2'-azobis(2-methylbutyronitrile) and dimethyl 2,2'-axobis(2-methyl propionate), 1,1'-azobis(cyclohexane-1-carbonitrile), and 4,4'-azobis(4-cyanovalerate), or the like. Particular examples of the polymerization initiator of a peroxide may include, decanoyl peroxide, lauroyl peroxide, benzoyl peroxide, bis(3,5,5-trimethylhexanoyl)peroxide, succinic acid peroxide, tert-butyl peroxy-2-ethylhexanoate, tert-butylperoxy pivalate, 1,1,3,3-tetramethylbutylperoxy-2-ethylhexanoate, or the like. These can be used alone or in a combination. The polymerization initiator of an azoic compound is more preferable, in view of excellent safety in handling. The amount of the polymerization initiator used can be selected depending on, for example, the molecular weight, kinds of monomer, a polymerization initiator, a chain transfer agent, a solvent of interest, composition of a repeating unit, polymerization temperature, the drip rate, or the like.

An acid catalyst used in the condensation reaction is, for example, mineral acids such as sulfuric acid, phosphoric acid, and perchloric acid; organic sulfonic acids such as methanesulfonic acid, p-toluenesulfonic acid, and a p-toluenesulfonic acid monohydrate; carboxylic acids such as formic acid and oxalic acid. Amongst these, methanesulfonic acid and a p-toluenesulfonic acid monohydrate are preferably used. When an acid catalyst is used, it is preferable to perform ion exchange treatment beforehand to remove the acid catalysts before adding a strong acid to a polymer solution in the following purification step. This is because the effect of the removal of the metal impurities by a subsequent ion exchange treatment will be improved.

As the acid catalyst for a living cationic polymerization, without particular limitation, a commonly used Lewis acid may be employed which will allow cationic polymerization of both an oxystyrene-based monomer and a vinyl ether-based monomer. Specifically, for example, organic metal halides such as $EtAlCl_2$, $Et_{1.5}AlCl_{1.5}$, or the like, and metal halides such as $TiCl_4$, $TiBr_4$, $BCl_3$, $BF_3$, $BF_3$—$OEt_2$, $SnCl_2$, $SnCl_4$, $SbCl_5$, $SbF_5$, $WCl_6$, $TaCl_5$, $VCl_5$, $FeCl_3$, $ZnBr_2$, $AlCl_3$, and $AlBr_3$, can be preferably used. These Lewis acids may be used alone or two or more Lewis acids may be mixed and used. It is more preferable to use in combination with an organic metal halide and a metal halide, and a mixed system of $EtAlCl_2$ and $SnCl_4$ is especially preferred.

The polymerization initiator is preferably added into a polymer system in a dissolved state in an organic solvent. The organic solvent which dissolves the polymerization initiator is not particularly limited, as long as the polymerization initiator is dissolved. Particular examples may include ketones, such as acetone, methyl ethyl ketone, methyl isobutyl ketone, methyl isoamyl ketone, methyl amyl ketone, cyclohexanone, or the like; alcohols such as methanol, ethanol, isopropanol, or the like; ether alcohols, such as ethylene glycol monomethyl ether, ethylene glycol monoethyl ether, propylene glycol monomethyl ether, propylene glycol monoethyl ether, or the like; ether esters, such as ethylene glycol monomethyl ether acetate, ethylene glycol monoethyl ether acetate, propylene glycol monomethyl ether acetate, propylene glycol mono ethyl ether acetate, or the like; esters such as methyl acetate, ethyl acetate, propyl acetate, isopropyl acetate, butyl acetate, methyl propionate, methyl lactate, ethyl lactate, or the like; ethers such as tetrahydrofurane 1,4-dioxane, ethylene glycol dimethyl ether, or the like; aromatic hydrocarbons such as toluene, xylene, or the like; N,N-dimethylformamide, acetonitrile, or the like. These solvents may be used alone respectively or two or more solvents may be mixed and used. Furthermore, water may be mixed to the extent that it can be dissolved with the above-described organic solvents and the polymerization initiator.

As for a chain transfer agent, those which are well-known can be used if necessary. Especially, a thiol compound is preferable and may be selected from a wide range of well-known thiol compounds. Specifically, mention can be made to t-dodecyl mercaptan, mercaptoethanol, mercaptoacetic acid, mercaptopropionic acid, or the like. Moreover, a thiol compound having a structure in which a 2-hydroxy-1,1,1,3,3,3-hexafluoro-2-propyl group is bound to a saturated aliphatic hydrocarbon is especially preferable since it has an effect to suppress roughness and deficiency of a lithography pattern. The amount of the chain transfer agent used can be selected depending on, for example, the molecular weight, kinds of monomer, a polymerization initiator, a chain transfer agent, a solvent of interest, composition of a repeating unit, polymerization temperature, the drip rate, or the like.

It is possible to supply the monomer and the polymerization initiator as they are, without dissolving in a solvent when those itself is a liquid. However, when the monomer or the polymerization initiator is a viscous liquid or a solid, it is necessary to be dissolved in the solvent and used. The concentration of the monomer and the polymerization initiator is preferably high, in view of productivity. However, excessively high concentration will increase the solution viscosity and worsen the operability, and when the monomer or the polymerization initiator is a solid, it will precipitate, or diffusion in the polymer may take time and a high polymer may be easily generated. Therefore, it is preferable to select a concentration which allows sufficient dissolving of each monomer and the polymerization initiator and easy diffusion in the polymer without precipitating, within the viscosity range which causes no problem to the supplying operation. Specific concentration varies depending on, for example, the combination of the solute and the solvent of each solution, solvent, and normally, the sum total concentration of all the monomer and the concentration of the polymerization initiator are adjusted to be in the range of, for example, 5 to 60 mass %, preferably 10 to 50 mass % respectively.

Further, the temperature of the monomer solution is not preferably low since when it is added dropwise to the polymerization system, it will result in a topical low temperature and a high concentration of the monomer, whereby a high polymer can be generated. For this reason, the monomer solution is preferably preheated and supplied.

A method for preheating the monomer solution includes a method for heating by a heat exchanger, or the like, just before the monomer solution is supplied into a reservoir or the polymer system. The temperature of preheating is preferably 25° C. or more and more preferably 30° C. or more. However, when the monomer solution is preheated in a reservoir, heating state will be kept for a long time and a high polymer may be generated when the temperature is high. For this reason, preheating in the reservoir is carried out at preferably 50° C. or less, more preferably 40° C. or less. In addition, the initiator solution can also be preheated, however, when the temperature is too high, the polymerization initiator will decompose before being supplied. Therefore, the temperature is normally 40° C. or less, preferably 30° C. or less, more preferably 25° C. or less.

The drop time in the mixing dropping method and the independent dropping method is not preferably short since the molecular weight distribution tends to widen and the temperature of the polymerization solution will fall since a large amount of the solution is added dropwise at once. On the contrary, long time is not preferable since a heat history is applied to the copolymer more than needed and the productivity decreases. Therefore, normally the drop time is selected from the range from 0.5 to 24 hours, preferably from 1 to 12 hours, especially preferably from 2 to 8 hours.

Moreover, it is preferable to maintain the temperature for a certain time after dropwise addition and after heat elevation to the polymerization temperature in the lump heating method, or perform maturation by, for example, further heating to subject the remaining unreacted monomer for reaction. The maturation time is not preferably too long since the production efficiency per time falls and the heat history is applied to the copolymer more than needed. Therefore, normally the maturation time is selected from the range of within 12 hours, preferably within 6 hours, especially preferably from 1 to 4 hours.

The solvent used for the polymerization reaction is not particularly limited, as long as it is a solvent which will allow for a stable dissolution of the raw monomer, the obtained copolymer, the polymerization initiator, and the chain transfer agent. Specific examples of a polymerization solvent may include, water; ketones such as acetone, methyl ethyl ketone, methyl isobutyl ketone, methyl isoamyl ketone, methylamyl ketone, cyclohexanone, or the like; alcohols such as methanol, ethanol, isopropanol, or the like; ether alcohols such as ethylene glycol monomethyl ether, ethylene glycol monoethyl ether, propylene glycol monomethyl ether, propylene glycol monoethyl ether, or the like; esters such as methyl acetate, ethyl acetate, isopropyl acetate, propyl acetate, butyl acetate, methyl propionate, methyl lactate, ethyl lactate, or the like; ether esters such as ethylene glycol monomethyl ether acetate, ethylene glycol monoethyl ether acetate, propylene glycol monomethyl ether acetate, propylene glycol mono ethyl ether acetate, or the like; ethers such as a tetrahydrofuran, 1,4-dioxane, ethylene glycol dimethyl ether, or the like; aromatic hydrocarbons such as toluene, xylene, or the like, N,N-dimethylformamide, acetonitrile, or the like. Preferred are acetone, methyl ethyl ketone, methyl isobutyl ketone, isopropanol, propylene glycol monomethyl ether, methyl acetate, ethyl acetate, isopropyl acetate, propyl acetate, methyl propionate, tetrahydrofuran, 1,4-dioxane, ethylene glycol dimethyl ether, toluene, and acetonitrile, in view of the solubility and the boiling points of the monomer, the polymerization initiator, the chain transfer agent, and the copolymer. These can be used alone or two or more kinds can be mixed and used. Moreover, compounds may be used having a high solubility of the monomer, the polymerization initiator, the chain transfer agent, and the copolymer and a high boiling point such as ethylene glycol monobutyl ether, 3-methoxy-3-methyl-1-butanol, 3-methoxy-3-methyl-1-butyl acetate, 3-ethoxyethyl propionate, γ-butyrolactone, diethylene glicol dimethyl ether, N-methyl pyrolidone, dimethylsulfoxide, or the like.

The amount of the polymerization solvent used is not particularly limited, however, when the amount of solvent used is too small, the monomer may precipitate or the polymer system may not be kept homogeneously since the viscosity becomes too high, and when the amount is too large, the inversion rate of the monomer may be insufficient or the molecular weight of the copolymer may not reach the desired value. Normally, the amount used is from 0.5 to 20 parts by weight, preferably from 1 to 10 parts by weight based on 1 part by weight of the monomer.

The amount of the polymerization solvent initially charged into the reaction tank (hereinafter may be referred to as initially charged solvent) in the mixing dropping method and the independent dropping method may be just more than the minimum quantity allowable for stirring. However, it is not preferable when the amount is more than needed since the amount of the suppliable monomer solution decreases, resulting in reduction in the production efficiency. Normally, the used amount is selected from the range of, for example, volume ratio of 1/30 or more, preferably from 1/20 to 1/2, especially preferably from 1/10 to 1/3, based on the final prepared amount (i.e., the total amount of the initially charged solvent, and the monomer solution and initiator solution to be added dropwise). A part of the monomer may be mixed into the initially charged solvent beforehand.

Polymerization temperature can be suitably selected depending on the boiling points of the solvent, the monomer, the chain transfer agent, or the like and the half-life temperature, or the like, of the polymerization initiator. Low temperature will suppress polymerization, causing a problem in productivity and when the temperature is unnecessarily high, there is a problem of safety of the monomer and the copolymer. Therefore, the temperature is selected from the range of preferably from 40 to 160° C. and especially preferably from 60 to 120° C. The polymerization temperature needs to be precisely controlled since it will greatly affect the molecular weight of the copolymer and the copolymerization composition. On the other hand, a polymerization reaction is generally an exoergic reaction and the polymerization temperature has a tendency to rise, making it difficult to control the temperature to a constant temperature. For this reason, it is preferable to contain at least one or more compound having a boiling point near the target polymerization temperature and set the polymerization temperature higher than the initial boiling point in the polymerization pressure of such compound. According to this method, the polymerization temperature can be prevented from rising by the latent heat of vaporization of the polymerization solvent.

The polymerization pressure is not particularly limited and may be any of normal pressure, pressurized, or depressurized, and normally it is normal pressure. Radical polymerization is preferably performed around the atmospheric pressure with the polymerization system as an open system, in order to prevent the polymerization pressure from changing since in the case of an azo system, nitrogen gas is emitted and in the case of a peroxide system, oxygen gas is emitted, when the radical is generated from the initiator.

(Polymerization Reaction Apparatus)

A conventionally well-known polymerization reaction apparatus can be used for the method for producing the polymer for an electronic material according to the present invention. For example, in the above-described dropping polymerization method, it is preferable to use a polymerization reaction apparatus comprising at least a solution reservoir containing the raw monomer, a solution reservoir containing the polymerization initiator, and a polymerization reaction tank. Use of such apparatus will allow reduction in the procedures, time and cost of the manufacturing process.

(Purification Step)

A polymer obtained from polymerization reaction contains a polymerization solvent, an unreacted monomer, an oligomer, a polymerization initiator, a chain transfer agent, a reaction by-product, metal impurities, or the like. In the present invention, these impurities, especially metal impurities, can be removed according to the following purification step.

In the purification step according to the present invention, a strong acid having 0 or less pKa is added to a polymer solution containing a polymer. Then, the polymer solvent to which a strong acid is added is subjected to ion exchange treatment and the concentration of the metal ion impurities is reduced. The metal ions especially reduced by such treatment include, Fe, Ni, Zn, Sn, Ti, Ag, W, or the like.

The pKa of the strong acid to be added to polymer solution is 0 or less, preferably from −15 to 0, more preferably from −10 to 0, further preferably from −5 to 0. As for such strong acid, it is preferable to use at least one selected from the group consisting of organic sulfonic acid, sulfuric acid (pKa=−3), and trifluoroacetic acid (pKa=0), and it is more preferable to use at least one organic sulfonic acid selected from the group consisting of trifluoro methanesulfonic acid (pKa=−13), methanesulfonic acid (pKa=−2.0), and p-toluenesulfonic acid (pKa=−2.8).

Preferably, the ion exchange treatment is carried out using an ion exchange resin. The method of ion exchange can be suitably selected from a lump method, a fixed-bed flow type method (column), and other methods. As for the ion exchange resin, cationic or anionic may be used alone or in combination, and preferably, an anionic ion exchange resin is used. The use of an anionic ion exchange resin has a large effect for reducing the concentration of the metal ion impurities, and at the same time (in one step), can remove the added strong acid. Accordingly, it is possible to improve the simplicity of the purification step.

According to the purification step of the present invention, the polymerization reaction liquid may be treated with conventional filtration and re-precipitation, or the like. Specifically, it is performed by adding a good solvent to a polymerization reaction solution if necessary to dilute, then brought into contact with a poor solvent to precipitate a copolymer as a solid, and the impurities are extracted to a poor solvent phase (hereinafter referred to as "precipitation extraction treatment"), or by extracting the impurities to a poor solvent phase as a liquid-liquid two phase. When the precipitation extraction treatment is performed, further purification can be performed by a step of separating the precipitated solid from the poor solvent phase by a method of filtration, decantation, or the like, subsequently re-dissolving the solid with a good solvent, and further adding a poor solvent to perform a precipitation extraction treatment, or by a step of washing the precipitated solid with a poor solvent. Moreover, when liquid-liquid two layers separation is performed, it is possible to further purify by separating the poor solvent phase with liquid separation, then adding a poor solvent to the obtained copolymer solution to perform a precipitation extraction treatment, or by a liquid liquid two phase separation. With respect to these operations, same operations may be repeated or different operations may be combined.

The poor solvent used for the purification step may include a compound having a hydroxyl group such as water, methanol, ethanol, isopropanol, ethylene glycol, ethyl lactate, or the like; straight-chained, branched, or cyclic saturated hydrocarbons such as pentane, n-hexane, iso-hexane, n-heptane, cyclopentane, ethyl cyclohexane, or the like; aromatic hydrocarbons such as toluene, xylene, or the like. These solvents can be used alone or two kinds or more may be mixed and used. Moreover, the good solvent may include the above-described polymerization solvent and a solvent illustrated for a solvent for film formation, or the like, to be mentioned below, and it can also be used in a mixture with a poor solvent.

The kind and amount of the poor solvent used for the purification step is not particularly limited, as long as the copolymer can be separated with the low molecular weight compound, and can be suitably selected depending on the solubility in the poor solvent of the copolymer, the kind and amount of the solvent used for polymerization, the kind and amount of the impurities, or the like. When the amount of the poor solvent is small, impurities such as the polymerization solvent and the unreacted monomer will not be fully separated and on the contrary, a large amount will, for example, increase waste liquid and therefore, it is not preferable in view of workability and cost. Generally, the amount is from 0.5 to 50 times, preferably from 1 to 20 times, more preferably from 2 to 10 times in weight, based on the total amount of the polymerization reaction liquid diluted with the good solvent if needed.

The temperature of the purification step needs to be strictly controlled, since it has a large influence on the molecular weight of the copolymer, the molecular weight distribution, the remaining monomer, the removal rate of the impurities such as the initiator residue, and moreover various characteristics in lithography, or the like. It is not efficient for the temperature of the purification step being too low since the solubility of the impurities in a precipitation extraction treatment solvent or a washing solvent will be insufficient, and the impurities will not be fully removed; and on the contrary, it is not preferable when the temperature is too high since the copolymer will elute to a precipitation extraction treatment solvent and a washing solvent, resulting in, for example, losing composition balance in the low molecule domain of the copolymer and decrease in the yield. For this reason, the purification step is performed at a temperature in the range from 0 to 40° C., preferably from 0 to 30° C.

The thus purified copolymer may be dried and recovered as powder, or may beredissolved by addition of a good solvent before or after drying, to be recovered as a solution. As for the good solvent used for redissolving, there can be used the above-described polymerization solvents, solvents for film formation to be mentioned below, or the like.

After the above-described purification, the solvent of the copolymer solution may be replaced with a solvent for film formation, suitable for the lithography composition to be mentioned below. The method for substitution involves heating the copolymer solution under reduced pressure to distill off the low boiling point substances such as the solvent used for purification, and supplying thereto a solvent for film formation while further distilling off the initial solvent and the supplied solvent together. It is possible to finish the copolymer into a solution for film formation by removing low boiling point impurities such as the solvent used at the time of purification.

The solvent for film formation is not particularly limited, as long as it dissolves the copolymer, and normally, it is selected upon considering the boiling point, influences on a semiconductor board or other coating films, and absorbance of the radiation used for lithography. Examples of the solvent commonly used for film formation include solvents such as propylene glycol monomethyl ether acetate, propylene glycol monomethyl ether, propylene glycol n-butyl ether, dipropylene glycol n-propyl ether, dipropylene glycol n-butyl ether, ethyl lactate, methyl amyl ketone, γ-butyrolactone, cyclohexanone, and 4-methyl-2-pentanol, or the like.

In addition, when the copolymer is recovered as powder after purification, it can be mixed with the film formation solvent and dissolved to obtain a solution for film formation.

Furthermore, the copolymer solution (or the above-described solution for film formation) is preferably filtered through a filter in order to remove microgels, such as high polymers, which may cause pattern defects of the resist and hence are not preferred. The filtration accuracy of a filter is 0.2 μm or less, preferably 0.1 μm or less, especially preferably 0.05 μm. The material of the filter may include polyolefins such as polyethylene and polypropylene; polar group-containing resins such as polyamide, polyester, and polyacrylonitrile; and fluorine-containing resins such as polyethylene fluoride, and polyamide is especially preferable. Examples of the polyamide-based filter include, (hereinafter registered trademarks) Ultipleat P-nylon 66 and Ultipor N66 manufactured by Pall Corporation, LifeASSURE PSN series and LifeASSURE EF series manufactured by Cuno INC, or the like. The polyolefin-based filter may include, Micro Guard Plus HC10 and Optimizer D manufactured by Nihon Entegris K.K., or the like. These filters may be used alone respectively or 2 or more kinds may be combined and used.

<Polymer for Electronic Material>

Since the polymer for an electronic material manufactured by the present invention undergoes the above-described purification step, the content of the metal impurities can be reduced. The concentration of the metal ion impurities in a polymer is preferably 10 ppb or less, more preferably 5 ppb or less, and further more preferably 2 ppb or less. Especially, the metal ions to be reduced include Fe, Ni, Zn, Sn, Ti, Ag, W, or the like. Metal species having a large reduction effect vary depending on the kind of polymer, and especially heavy metal species have a large reduction effect. Such polymer for an electronic material having a reduced concentration of the metal ion impurities can be used for all fields in which contamination and influence by metal ions need to be avoided; and it can be suitably used as a film forming material for semiconductor lithography, a lower layer film formation material, an insulated film formation material, a material for a flat panel display, a sealing material, a hardening material, or the like.

Although the structure of the polymer is not particularly limited, the structure is preferably one in which decomposition of the polymer is not likely to occur due to an action of a strong acid in the purification step. For example, it is preferable to copolymerize the following combination of the monomers as follows.

(Aromatic-Based Monomer and Aldehyde-Based and/or Ketone-Based Monomer)

The polymer is preferably one obtained by addition condensation reaction of an aromatic-based monomer with an aldehyde-based and/or a ketone-based monomer, and more preferably, is a phenol novolac resin by addition condensation reaction of a phenol-based monomer with an aldehyde-based and/or a ketone-based monomer.

The aromatic-based monomer preferably has a benzene nucleus, more preferably a phenol nucleus, and may have two or more of these. Examples of a phenol-based monomer include 1,1,2,2-tetrakis(4-hydroxyphenyl) ethane, 1,1,2,2-tetrakis (3-methyl 4-hydroxy phenyl) ethane, 1,1,2,2-tetrakis (4-hydroxymethylphenyl) ethane, 1,1,3,3-tetrakis (4-hydroxyphenyl) propane, α,α,α',α'-tetrakis (4-hydroxyphenyl)-p-xylene, α,α,α',α'-tetrakis (3-methyl-4-hydroxyphenyl)-p-xylene, α,α,α',α'-tetrakis (4-methoxy phenyl)-p-xylene, α,α,α',α'-tetrakis (4-hydroxyphenyl)-2,5-dimethyl-p-xylene, α,α,α',α'-tetrakis (4-hydroxyphenylmethyl)-naphthalene, tris (4-hydroxyphenyl)methane, tris(4-hydroxyphenyl)ethane, 9,9-bis(4-hydroxy phenyl)fluorine, or the like. Examples of an aromatic-based monomer include heteroaromatic compounds such as phenothiazine, carbazole, indole, pyridine, pyrrole, quinoline, or the like; aryl amines such as aniline, N-methylaniline, N-ethylaniline, N-n-propylaniline, N-isopropylaniline, dimethyl phenyl amine, ethyl methyl phenyl amine, diethyl phenyl amine, diphenyl amine, phenyl naphthyl amine, dinaphthyl amine, 3-hydroxy diphenylamine, diphenyl methylamine, diphenyl ethyl amine, n-propyl diphenylamine, isopropyl diphenylamine, triphenyl amine, phenyl anthraamine, naphthyl anthraamine, and diphenyl anthraamine, or the like. These monomers may be used in one kind or by combining two or more kinds.

Examples of an aldehyde-based monomer include saturated aliphatic aldehydes such as formaldehyde, paraformaldehyde, acetaldehyde, propylaldehyde, butylaldehyde, isobutyl aldehyde, valeraldehyde, capronaldehyde, 2-methyl butylaldehyde, hexyl aldehyde, undecane aldehyde, 7-methoxy-3,7-dimethyloctylaldehyde, cyclohexane aldehyde, 3-methyl-2-butylaldehyde, glyoxal, malonaldehyde, succinaldehyde, glutaraldehyde, glutaraldehyde, adipic aldehyde, or the like; unsaturated aliphatic aldehydes such as acrolein, methacrolein, or the like; heterocyclic aldehydes such as furfural, pyridine aldehyde, or the like; aromatic aldehydes such as benzaldehyde, naphtylaldehyde, 9-anthrylaldehyde, phenanthrylaldehyde, salicylaldehyde, phenylacetaldehyde, 3-phenyl propionaldehyde, tolylaldehyde, (N,N-dimethylamino) benzaldehyde, acetoxy benzaldehyde, 1-pyrene aldehyde, and trifluoromethyl benzaldehyde, or the like; and especially preferably used is aromatic aldehyde. As a ketone-based monomer, diaryl ketone is preferable, and examples include diphenyl ketone, phenyl naphthyl ketone, dinaphthyl ketone, phenyl tolyl ketone, ditolyl ketone, 9-fluorenone, or the like. These monomers may be used in one kind or by combining two or more kinds.

(Oxystyrene-Based Monomer and Vinyl Ether-Based Monomer)

The polymer is preferably one obtained by living cationic polymerization of an oxystyrene-based monomer with a vinyl ether-based monomer. Examples of an oxystyrene-based monomer include hydroxy styrene, such as p-hydroxy styrene, m-hydroxy styrene, o-hydroxy styrene, p-isopropenyl phenol, m-isopropenyl phenol, o-isopropenyl phenol, or the like; alkoxy styrenes such as p-methoxy styrene, m-methoxy styrene, p-ethoxy styrene, m-ethoxy styrene, p-propoxy styrene, m-propoxy styrene, p-isopropoxy styrene, m-isopropoxy styrene, p-n-butoxy styrene, m-n-butoxy styrene, p-isobutoxy styrene, m-isobutoxy styrene, p-tert-butoxy styrene, m-tert-butoxy styrene or the like; alkoxy alkyloxystyrenes such as p-methoxymethoxy styrene, m-methoxymethoxy styrene, p-(1-ethoxyethoxy) styrene, m-(1-ethoxyethoxy)styrene, p-(2-tetra hydropyranyl) oxystyrene, m-(2-tetrahydropyranyl) oxystyrene, or the like; alkanoyloxy styrenes such as p-acetoxy styrene, m-acetoxy styrene, p-tert-butyl carbonyl oxystyrene, m-tert-butyl carbonyl oxystyrene, or the like; alkoxy carbonyl alkyl oxystyrenes such as p-methoxy carbonyl oxystyrene, m-methoxy carbonyl oxystyrene, p-tert-butoxy carbonyl oxystyrene, m-tert-butoxy carbonyl oxystyrene, or the like; alkoxy carbonyl alkyl oxystyrenes, such as p-tert-butoxy carbonyl methyl oxystyrene, m-tert-butoxy carbonyl methyl oxystyrene, or the like; alkylsilyl oxystyrenes such as p-tolyl methyl silyl oxystyrene, m-tolyl methyl silyl oxystyrene, ptert-butyl dimethylsilyl oxystyrene, m-tert-butyl dimethyl silyl oxystyrene, or the like. Especially, it is preferable to use p-hydroxy styrene, m-hydroxy styrene, p-isopropenyl phenol, m-isopropenyl phenol, p-tert-butoxy styrene, m-tert-butoxy styrene, p-acetoxy styrene, m-acetoxy styrene, or the like. These monomers may be used in one kind or by combining two or more kinds.

Examples of a vinyl ether-based monomer include alkyl vinyl ethers such as methyl vinyl ether, ethyl vinyl ether, propyl vinyl ether, isopropyl vinyl ether, n-butyl vinyl ether, sec-butyl vinyl ether, tert-butyl vinyl ether, isobutyl vinyl ether, n-amyl vinyl ether, isoamyl vinyl ether, or the like; fluoroalkyl vinyl ethers, such as trifluoro methyl vinyl ether, pentafluoro ethyl vinyl ether, 2,2,2-trifluoroethyl vinyl ether, or the like; alkoxyalkyl vinyl ethers, such as 2-methoxy ethyl vinyl ether, 2-ethoxy ethyl vinyl ether, 2-tetrahydropyranyl vinyl ether, 2-tetrahydrofuranyl vinyl ether, or the like; cycloalkyl vinyl ethers such as cyclopentyl vinyl ether, cyclohexyl vinyl ether, cyclo heptyl vinyl ether, cyclo octyl vinyl ether, 2-bicyclo[2.2.1]heptyl vinyl ether, 2-bicyclo [2.2.2] octyl vinyl ether, 8-tricyclo[$5.2.1.0^{2,6}$]decanyl vinyl ether, 1-adamantyl vinyl ether, 2-adamantyl vinyl ether, or the like; aryl vinyl ethers such as phenyl vinyl ether, 4-methyl phenyl vinyl ether, 4-trifluoro methyl phenyl vinyl ether, 4-fluorophenyl vinyl ether, or the like; arylalkyl vinyl ethers such as benzyl vinyl ether, 4-fluoro benzyl vinyl ether, or the like.

(Oxystyrene-Based Monomer and Styrene-Based Monomer)

The polymer is preferably obtained by radical polymerization of an oxystyrene-based monomer with a styrene-based monomer. Those described above can be used as the oxystyrene-based monomer. As a styrene-based monomer, styrenes other than an oxystyrene-based monomer can be used, and examples include, styrene, 4-tert butyl styrene, 4-vinyl benzoate, or the like. These monomers may be used in one kind or by combining two or more kinds.

(Oxystyrene-Based Monomer and (Meth) Acrylate-Based Monomer)

The polymer is preferably obtained by radical polymerization of an oxystyrene-based monomer with a (meth) acrylate-based monomer. Those described above can be used as the oxystyrene-based monomer. A (meta) acrylate-based monomer includes alkyl(meth)acrylates such as methyl(meth)acrylate, ethyl(meth) acrylate, butyl(meth)acrylate, hexyl(meth)acrylate, octyl(meth)acrylate, ethyl hexyl(meth) acrylate, or the like; cycloalkyl(meth)acrylates, such as cycloheptyl(meth)acrylate, cyclohexyl(meth)acrylate, cyclopentyl(meth)acrylate, cyclooctyl(meth)acrylate, or the like; (meth) acrylates having a spiro $C_{8-16}$ hydrocarbon ring such as spiro[4.4]nonyl, spiro [4.5]decanyl(meth)acrylate, spirobicyclohexyl(meth)acrylate, or the like; (meth)acrylates having a bicyclic hydrocarbon ring such as bornyl (meth) acrylate, norbornyl(meth)acrylate, isobornyl(meth) acrylate, isobornyl oxyethyl(meth)acrylate, or the like; (meth)acrylates having a tricyclic hydrocarbon ring such a dicyclo pentadienyl (meth) acrylate, dicyclo pentenyl (meth) acrylate, dicyclo pentenyl oxyalkyl(meth)acrylate, tricyclodecanyl(meth)acrylate (tricyclo[$5.2.1.0^{2,6}$]decanyl(meth) acrylate), tricyclodecanyl oxyethyl(meth) acrylate, tricyclo [$4.3.1.1^{2,5}$]undecanyl, adamantyl (meth) acrylate, or the like; (meth)acrylates having a tetracyclic hydrocarbon ring such as tetracyclo[$4.4.0.12,5.1^{7,10}$]dodecane, perhydro-1,4-methano-5,8-methano naphthalene, or the like. These monomers may be used in one kind or by combining two or more kinds.

EXAMPLES

Embodiments of the present invention will now be described in more details by way of Examples. However, the present invention is not limited in any way by these Examples. Unless otherwise indicated, a part is in mass standard.

[Weight Average Molecular Weight and Dispersion Degree]

The weight average molecular weight (Mw) and dispersion degree (Mw/Mn) of the polymer synthesized below are measured by GPC (gel permeation chromatography) by using polystyrene as a standard product. 0.02 g of polymer after purification was dissolved in 1 ml of tetrahydrofuran to prepare a sample for analysis. The injected amount of the sample into a device was set to 60 μl.

Measuring Apparatus: "HPLC-8320GPC" manufactured by TOSOH COMPANY, LIMITED
Detector: Differential refractive index (RI) detector
Column: Shodex GPC LF804×3 (manufactured by Showa Denko K.K.)
Eluent: Tetrahydrofuran
Flow rate: 1.0 mL/min
Temperature: 40° C.
Analytical curve: Created using a polystyrene correlation sample (manufactured by TOSOH COMPANY, LIMITED).

[Polymerization Composition Ratio]

The composition ratio of the polymer synthesized below was analyzed by $^{13}$C-NMR. 1 g of a polymer after purification and 0.1 g of Cr (III) acetylacetonate were dissolved in a mixed solvent of 1.5 g of heavy acetone and 0.5 g of methyl ethyl ketone to prepare a sample for analysis.

Apparatus: "AVANCE400" manufactured by Bruker
Nuclide: $^{13}$C
Method of measurement: Inverse gated decoupling
Integration times: 6000 times
Measurement tube diameter: 10 mm φ

[Metal Ion Concentration]

The metal ion concentration of the polymer synthesized below was measured by means of ICP mass spectrometry.
ICP mass spectroscope: "Agilent7500cs" manufactured by Agilent Technologies Japan, Ltd.

Example 1

104 parts of 9,9-bis(4-hydroxyphenyl)fluorene, 69 parts of 1-pyrene aldehyde, and 133 parts of propylene glycol monomethyl ether acetate (hereinafter referred to as "PGMEA") were fed into an eggplant shaped flask with a thermometer, a condenser tube, and a stirring device; the system inside was substituted with nitrogen with stirring; and heating was performed up to 120° C. Then, 40 parts of methanesulfonate was added dropwise gradually, and reaction was performed for 7 hours at 120° C. Subsequently, 148 parts of PGMEA was added and to dilute the polymer solution. This solution was added dropwise into a mixed solution of 741 parts of methanol and 248 parts of ion exchanged water (hereinafter referred to as "IEW"), and precipitation extraction treatment was performed. Further, 494 parts of methanol was used to wash the precipitated polymer.

The obtained polymer was redissolved in 687 parts of PGMEA and ion exchange treatment was performed beforehand using Amberlyst B20 (an anionic ion exchange resin manufactured by ORGANO CORPORATION) (sample 1). The measurement result of each metal ion concentration of sample 1 is shown in Table 1. Subsequently, 1.2 parts of methanesulfonate was further added to sample 1; Amberlyst B 20 (manufactured by ORGANO CORPORATION) was passed through again to perform ion exchange treatment; the concentration of the metal ion impurities was reduced; and the added methanesulfonate was removed simultaneously (sample 2). The polymer after purification was Mw=2490, Mw/Mn=1.80, and the yield was 79%.

The measurement result of each metal ion concentration of the obtained polymer (sample 2) is shown in Table 1. Fe concentration was 0.8 ppb based on the mass of the polymer, whereby it was found that especially Fe can be removed efficiently.

Example 2

104 parts of 9,9-bis(4-hydroxyphenyl)fluorene, 69 parts of 1-pyrene aldehyde, and 133 parts of PGMEA were fed into an eggplant shaped flask with a thermometer, a condenser tube, and a stirring device; the system inside was substituted with nitrogen with stirring; and heating was performed up to 120° C.

Then, 40 parts of methanesulfonate was added dropwise gradually, and reaction was performed for 7 hours at 120° C. Subsequently, 148 parts of PGMEA was added and to dilute the polymer solution. This solution was added dropwise into a mixed solution of 741 parts of methanol and 248 parts of IEW, and precipitation extraction treatment was performed. Further, 494 parts of methanol was used to wash the precipitated polymer.

The obtained polymer was redissolved in 687 parts of PGMEA and ion exchange treatment was performed beforehand using Amberlyst B20 (manufactured by ORGANO CORPORATION) (sample 1). Subsequently, 1.2 parts of methanesulfonate was added to sample 1, and Amberlyst 15 J-WET (a cationic ion exchange resin) was passed through to perform ion exchange treatment, resulting in reduction of the concentration of the metal ion impurities (sample 2). The polymer after purification was Mw=2490, Mw/Mn=1.80, and the yield was 79%.

The measurement result of each metal ion concentration of the obtained polymer (sample 2) is shown in Table 1. Fe concentration was 0.9 ppb based on the mass of the polymer, whereby it was found that especially Fe can be removed efficiently.

Comparative Example 1

104 parts of 9,9-bis(4-hydroxyphenyl)fluorene, 69 parts of 1-pyrene aldehyde, and 133 parts of PGMEA were fed into an eggplant shaped flask with a thermometer, a condenser tube, and a stirring device; the system inside was substituted with nitrogen with stirring; and heating was performed up to 120° C.

Then, 40 parts of methanesulfonate was added dropwise gradually, and reaction was performed for 7 hours at 120° C. Subsequently, 148 parts of PGMEA was added and to dilute the polymer solution. This solution was added dropwise into a mixed solution of 741 parts of methanol and 248 parts of IEW, and precipitation extraction treatment was performed. Further, 494 parts of methanol was used to wash the precipitated polymer.

The obtained polymer was redissolved in 687 parts of PGMEA and ion exchange treatment was performed beforehand using Amberlyst B20 (manufactured by ORGANO CORPORATION) (sample 1). Subsequently, Amberlyst B 20 (manufactured by ORGANO CORPORATION) was passed through again and sample 1 was demetallized (sample 2). The polymer after purification was Mw=2490, Mw/Mn=1.80, and the yield was 79%.

The measurement result of each metal ion concentration of the obtained polymer is shown in Table 1. It was found that reduction effect was not seen in any of the metal species.

Comparative Example 2

104 parts of 9,9-bis(4-hydroxyphenyl)fluorene, 69 parts of 1-pyrene aldehyde, and 133 parts of PGMEA were fed into an eggplant shaped flask with a thermometer, a condenser tube, and a stirring device; the system inside was substituted with nitrogen with stirring; and heating was performed up to 120° C.

Then, 40 parts of methanesulfonate was added dropwise gradually, and reaction was performed for 7 hours at 120 t. Subsequently, 148 parts of PGMEA was added and to dilute the polymer solution. This solution was added dropwise into a mixed solution of 741 parts of methanol and 248 parts of IEW, and precipitation extraction treatment was performed. Further, 494 parts of methanol was used to wash the precipitated polymer.

The obtained polymer was redissolved in 687 parts of PGMEA and ion exchange treatment was performed beforehand using Amberlyst B20 (manufactured by ORGANO CORPORATION) (sample 1). Subsequently, Amberlyst 15J-WET (manufactured by ORGANO CORPORATION) was passed through again and sample 1 was demetallized (sample 2). The polymer after purification was Mw=2490, Mw/Mn=1.80, and the yield was 79%.

The measurement result of each metal ion concentration of the obtained polymer (sample 2) is shown in Table 1. It was found that reduction effect was not seen in any of the metal species.

TABLE 1

|  | Acid addition | Ion Exchange Resin | Metal Ion Impurity Concentration (ppb) | | | | | | |
|---|---|---|---|---|---|---|---|---|---|
|  |  |  | Fe | Ni | Zn | Sn | Ti | Ag | W |
| Common in each Example (Sample 1) | — | B20 | 4.7 | 0.2 | 1.2 | 0.2 | 0.6 | 0.2 | 0.1 |
| Example 1 (sample 2) | ○ | B20 | 0.8 | 0 | 0.3 | 0.1 | 0.5 | 0.2 | 0.1 |
| Example 2 (sample 2) | ○ | 15J | 0.9 | 0 | 0.3 | 0.2 | 0.5 | 0 | 0.1 |
| Comparative Example 1 (sample 2) | x | B20 | 4.5 | 0.2 | 1.1 | 0.1 | 0.5 | 0 | 0.1 |
| Comparative Example 2 (sample 2) | x | 15J | 4.5 | 0.2 | 1.2 | 0.2 | 0.6 | 0.2 | 0.1 |

Example 3

34 parts of phenothiazine, 20 parts of 1-pyrene aldehyde, 15 parts of 4-trifluoromethyl benzaldehyde, and 67 parts of PGMEA were fed into an eggplant shaped flask with a thermometer, a condenser tube, and a stirring device; the system inside was substituted with nitrogen with stirring; and heating was performed up to 120° C. Then, 1 part of methanesulfonate was added dropwise gradually, and reaction was performed for 6 hours at 120° C. Subsequently, 59 parts of PGMEA was added and to dilute the polymer solution. This solution was added dropwise into 390 parts of methanol, and precipitation extraction treatment was performed. Further, 196 parts of methanol was used to wash the precipitated polymer.

The obtained polymer was redissolved in 277 parts of PGMEA and ion exchange treatment was performed beforehand using Amberlyst B20 (manufactured by ORGANO CORPORATION) (sample 1). The measurement result of each metal ion concentration of sample 1 is shown in Table 2. Subsequently, 0.4 part of methanesulfonate was added to sample 1; Amberlyst B 20 (manufactured by ORGANO CORPORATION) was passed through again to perform ion exchange treatment; the concentration of the metal ion impurities was reduced; and the added methanesulfonate was removed simultaneously (sample 2). The polymer after purification was Mw=5860, Mw/Mn=2.23, and the yield was 80%.

The measurement result of each metal ion concentration of the obtained polymer (sample 2) is shown in Table 2. In this polymer, it was found that the reduction effect of the metal ion concentrations of Na, Ca, Zn, Ti, Ag, and W was high.

Example 4

1550 parts of a methanol solution of 25% p-hydroxystyrene, 51 parts of styrene, and 11 parts of azobisisobutyronitril (hereinafter referred to as "AIBN") were fed into an eggplant shaped flask with a thermometer, a condenser tube, and a stirring device; the system inside was substituted with nitrogen with stirring; and heating was performed up to 80° C. After the internal temperature reached to 80° C., a mixed solution of 43 parts of a methanol solution of 25% p-hydroxystyrene, 1 part of styrene, and 2 parts of AIBN was added dropwise over 2 hours. After dropwise addition had completed, aging was performed for 4 hours at 80° C. This solution was added dropwise into 1695 parts of toluene, and precipitation extraction treatment was performed to carry out decantation of the supernatant solution. Subsequently, the solution was dissolved with 130 parts of acetone, and washing with 1695 parts of toluene was performed for four times.

The obtained polymer was dissolved in 690 parts of PGMEA (sample 1). The measurement result of each metal ion concentration of sample 1 is shown in Table 3. Subsequently, 0.8 part of methanesulfonate was added to sample 1; Amberlyst B20 (manufactured by ORGANO CORPORATION) was passed through to perform ion exchange treatment; the concentration of the metal ion impurities was reduced; and the added methanesulfonate was removed simultaneously (sample 2). The polymer after purification was Mw=9710, Mw/Mn=1.69, and the yield was 59%.

The measurement result of each metal ion concentration of the obtained polymer (sample 2) is shown in Table 3. In this polymer, it was found that the reduction effect of the metal ion concentrations of Ca, Zn, Sn, Ag, and W was high.

TABLE 2

|  | Acid addition | Ion Exchange Resin | Metal Ion Impurity Concentration (ppb) | | | | | | | | |
|---|---|---|---|---|---|---|---|---|---|---|---|
|  |  |  | Na | Ca | Fe | Ni | Zn | Sn | Ti | Ag | W |
| Sample 1 | — | B20 | 2.4 | 1.4 | 0.6 | 0 | 6.9 | 0.3 | 2.9 | 1.7 | 1.2 |
| Sample 2 | ○ | B20 | 0.6 | 0.5 | 0.3 | 0 | 0.2 | 0.1 | 0.2 | 0 | 0.5 |

TABLE 3

| | Acid addition | Ion Exchange Resin | Metal Ion Impurity Concentration (ppb) | | | | | | | |
|---|---|---|---|---|---|---|---|---|---|---|
| | | | Ca | Fe | Ni | Zn | Sn | Ti | Ag | W |
| Sample 1 | — | — | 2.4 | 0.2 | 0.3 | 1.0 | 1.1 | 0.1 | 1.2 | 1.9 |
| Sample 2 | ○ | B20 | 0.6 | 0.1 | 0.1 | 0.1 | 0.4 | 0 | 0 | 0 |

Example 5

50 parts of a methanol solution of 25% p-hydroxystyrene, 25 parts of methyl methacrylate, and 40 parts of acetone were fed into an eggplant shaped flask with a thermometer, a condenser tube, and a stirring device; the system inside was substituted with nitrogen with stirring; and heating was performed up to 80° C. After the internal temperature reached to 80° C., a mixed solution of 43 parts of a methanol solution of 25% p-hydroxystyrene, 1 part of azobis(isobutyric acid)dimethyl, and 10 parts of acetone was added dropwise over 2 hours. After dropwise addition had completed, aging was performed for 4 hours at 80° C. This solution was added dropwise into 126 parts of toluene, and precipitation extraction treatment was performed to carry out decantation of the supernatant solution. Subsequently, the solution was dissolved with 25 parts of acetone, and washing with 126 parts of toluene was performed for four times.

The obtained polymer was dissolved in 128 parts of PGMEA (sample 1). The measurement result of each metal ion concentration of sample 1 is shown in Table 4. Subsequently, 0.2 part of methanesulfonate was added to sample 1; Amberlyst B20 (manufactured by ORGANO CORPORATION) was passed through to perform ion exchange treatment; the concentration of the metal ion impurities was reduced; and the added methanesulfonate was removed simultaneously (sample 2). The polymer after purification was Mw=6890, Mw/Mn=1.86, and the yield was 55%.

The measurement result of each metal ion concentration of the obtained polymer (sample 2) is shown in Table 4. In this polymer, it was found that the reduction effect of the metal ion concentrations of Ca, Fe, Ni, Zn, and Sn was high.

TABLE 4

| | Acid addition | Ion Exchange Resin | Metal Ion Impurity Concentration (ppb) | | | | | | | |
|---|---|---|---|---|---|---|---|---|---|---|
| | | | Ca | Fe | Ni | Zn | Sn | Ti | Ag | W |
| Sample 1 | — | — | 1.5 | 1.5 | 0.3 | 0.4 | 67 | 3.0 | 0.1 | 0.1 |
| Sample 2 | ○ | B20 | 0.7 | 1.2 | 0.1 | 0.1 | 58 | 2.7 | 0.1 | 0 |

Example 6

A glass vessel with a three-way cock was prepared, and after argon substitution, it was heated under argon atmosphere to remove the absorbed water in the glass vessel. 0.85 molar (hereinafter referred to as "M") of ethyl vinyl ether (hereinafter referred to as "EVE"), 1.0 M of ethyl acetate, 4 millimolar (hereinafter referred to as "mM") of 1,4-bis(1-acetoxyethoxy)butane, and 60 ml of toluene were put into the vessel and a toluene solution (20 mM) of ethyl aluminum sesquichloride ("Et1.5AlCl1.5") was added when the temperature inside the system reached to 0° C. to start polymerization.

The inversion rate of EVE was monitored using gas chromatography (GC) in a time-division manner, and 1.28 M of p-tert-butoxystyrene (hereinafter referred to as "PTBOS") was added to the reaction solution when conversion of the EVE monomer was completed, and further, reaction was continued at a reaction temperature of 0° C. After PTBOS addition, further a toluene solution (20 mM) of Et1.5AlCl1.5 was added when 106 hours had passed, and reaction was continued for 48 hours.

Methanol was added to the polymerization reaction system to stop the reaction; 4 mass % of aluminum oxide was added to the reaction mixture solution; the catalysts were absorbed and removed with stirring for 24 hours; and the aluminum oxide was removed by a filter having a pore size of 0.1 μm. This filtrate was depressurized and concentrated with an evaporator to obtain a PTBOS/EVE/PTBOS-based triblock polymer. The average composition (molar ratio) of this PTBOS/EVE/PTBOS-based triblock polymer was PTBOS/EVE=60/40. Mw=26100, Mw/Mn=1.45.

100 parts by mass of the PTBOS/EVE/PTBOS-based triblock polymer obtained as above and 300 parts by mass of propylene glycol monomethyl ether were introduced into a four-neck flask with a thermometer and a reflux condenser tube, and after heating at 60° C. with stirring, 3.5 parts by mass of 10% sulfuric acid was introduced and stirred for 30 hours at 60° C.

After the reaction had finished, the reaction solution was cooled to room temperature, fed into 1200 parts by mass of water, and the polymer was precipitated and filtered out. The obtained precipitate was depressurized to dryness and a p-hydroxy styrene/EVE/p-hydroxy styrene-based triblock polymer was obtained. The average composition (molar ratio) of this p-hydroxy styrene/EVE/p-hydroxy styrene-based triblock polymer was p-hydroxy styrene/EVE=60/40. Mw=25700, Mw/Mn=1.56.

The measurement result of each metal ion concentration of sample 1 is shown in Table 5. Subsequently, 0.7 part of methanesulfonate was added to sample 1; Amberlyst B20 (manufactured by ORGANO CORPORATION) was passed through to perform ion exchange treatment; the concentration of the metal ion impurities was reduced; and the added methanesulfonate was removed simultaneously. The polymer after purification was Mw=17400, Mw/Mn=1.40, and the yield was 70%.

The measurement result of each metal ion concentration of the obtained polymer (sample 2) is shown in Table 5. In this polymer, it was found that the reduction effect was high, despite the high concentrations of particularly Fe, Ni, and Sn.

TABLE 5

| | Acid addition | Ion Exchange Resin | Metal Ion Impurity Concentration (ppb) | | | | | | | | |
|---|---|---|---|---|---|---|---|---|---|---|---|
| | | | Na | Ca | Fe | Ni | Zn | Sn | Ti | Ag | W |
| Sample 1 | — | — | 15 | 5.8 | 120 | 25 | 3.2 | 150 | 0.1 | 2.2 | 0.1 |
| Sample 2 | o | B20 | 7.1 | 0.6 | 45 | 8.2 | 0.4 | 61 | 0.1 | 0.1 | 0.1 |

The invention claimed is:

1. A method for producing a polymer for an electronic material comprising:
   a polymerization step of obtaining a polymer by radical polymerizing an oxystyrene-based monomer with a (meth)acrylate-based monomer; and
   a purification step of adding a strong acid having 0 or less pKa to the polymer solution and subsequently performing an ion exchange treatment to reduce the concentration of metal ion impurities.

2. The method for producing a polymer for an electronic material according to claim 1, wherein
   the strong acid is at least one selected from the group consisting of organic sulfonic acid, sulfuric acid, and trifluoroacetic acid.

3. The method for producing a polymer for an electronic material according to claim 1, wherein
   the strong acid is at least one organic sulfonic acid selected from the group consisting of trifluoro methanesulfonic acid, methanesulfonic acid, and p-toluenesulfonic acid.

* * * * *